(No Model.)
W. MILLS.
ELECTRIC BATTERY.
No. 588,592. Patented Aug. 24, 1897.
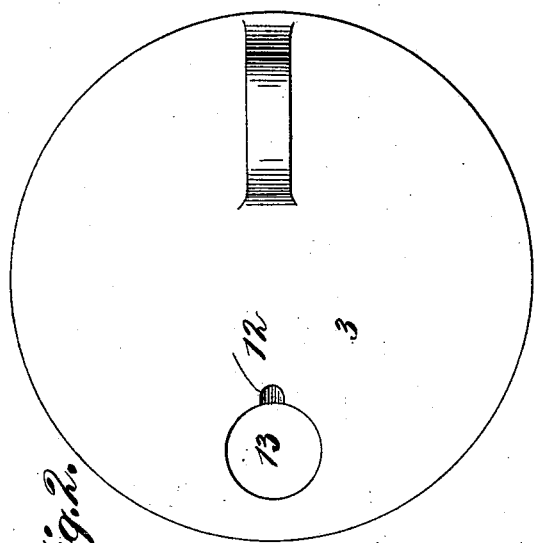
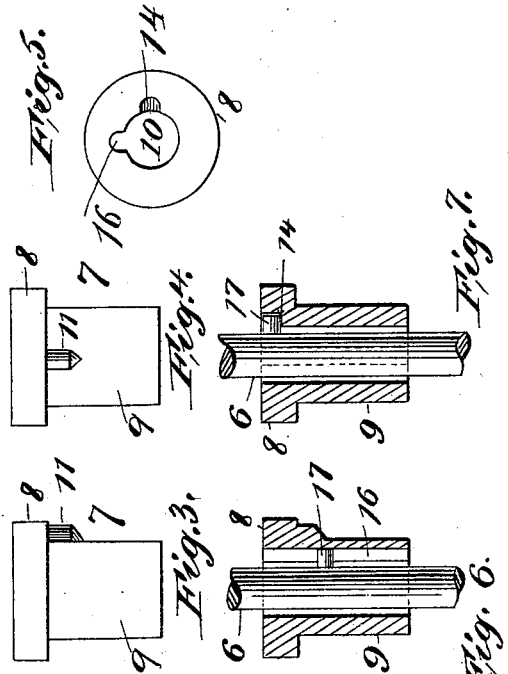
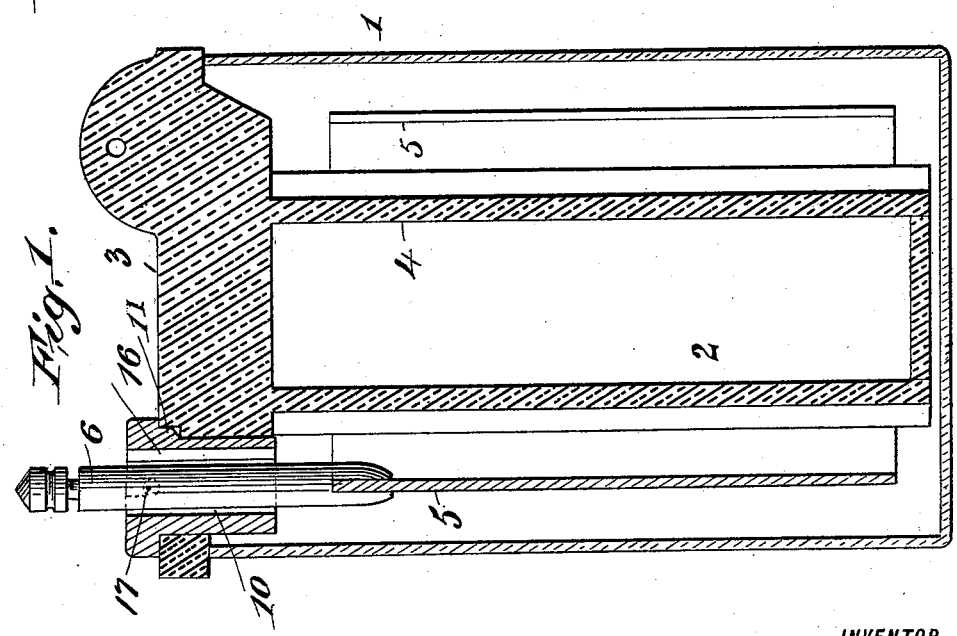
WITNESSES
INVENTOR
William Mills
BY
Joseph L. Levy
ATTORNEY

UNITED STATES PATENT OFFICE.

WILLIAM MILLS, OF ELIZABETH, NEW JERSEY, ASSIGNOR TO THE NEW YORK CARBON WORKS, OF NEW YORK, N. Y.

ELECTRIC BATTERY.

SPECIFICATION forming part of Letters Patent No. 588,592, dated August 24, 1897.

Application filed November 30, 1896. Serial No. 613,857. (No model.)

*To all whom it may concern:*

Be it known that I, WILLIAM MILLS, a citizen of the United States, residing at Elizabeth, county of Union, State of New Jersey, have invented certain new and useful Improvements in Electric Batteries, of which the following is a specification.

My invention relates to improvements in electric-battery construction; and it has special reference to improvements upon the insulating-bushing and zinc-support illustrated in my application filed on the 30th day of November, 1896, Serial No. 613,856. In that application the zinc element was a plate disposed in circular form from which a zinc post arose, the post passing through an insulating-bushing, which bushing was detachably secured to the zinc plate, the bushing both supporting the zinc and insulating it from the cover of the cell.

My present invention involves an insulating-bushing which passes through and rests upon the cover of the cell and which is provided with a detachable connection with the zinc, formed by a recess in the bushing, and a stud on the zinc rod passing therethrough, such bushing also having a furrow formed on its inner surface which runs entirely through the bushing to allow of the bushing being withdrawn from the zinc rod to disengage the parts, the stud on the rod and the recess in the bushing serving as the means for supporting the zinc from said bushing, which at the same time insulates the rod from the cover.

My invention also embraces means for preventing the bushing from turning in the cover.

My invention further consists in the details of construction hereinafter described, and further pointed out in the claims.

In the drawings, Figure 1 is a sectional elevation of a battery containing my improvements; Fig. 2, a plan view of the carbon electrode; Figs. 3 and 4, respectively, side and front elevations of the bushing; Fig. 5, a plan view of the bushing; and Figs. 6 and 7, respectively, sectional elevations of the bushing, showing the method of attaching and detaching the zinc rod therefrom.

Similar numerals of reference indicate like parts in the several views.

In the drawings forming part of this specification, 1 indicates a conventional containing-cell; 2, a carbon element comprising a cover 3, resting on the upper edge of the cell, and 4 a depending carbon element.

At 5 is the zinc element, formed of a plate of zinc bent in a circular form, which incloses the carbon element and is supported from the cover and insulated therefrom by means now to be described. Such means comprises a zinc rod 6, secured to the plate 5 in any desired manner, it being shown herein as split at the end and the zinc passing within the split end.

The rod 6, near its upper portion, is provided with an outwardly-extending lug or projection 17, which forms one element of the means for supporting the zinc within the cell and above its bottom.

At 7 is a hollow insulating-bushing comprising an enlarged head 8 and a cylindrical body 9, the aperture 10 therein passing through both the head and body. This bushing, which may be of porcelain or other suitable non-conducting materials, has provided at the junction of the head and cylindrical body 9 an outwardly-extending boss 11, adapted to engage a recess or seat 12, formed at the periphery of the opening 13 in the cover 3, through which the bushing extends, the head of the bushing resting on the cover which supports the former, and the boss 11 engaging the recess 12 prevents the bushing from turning in the cover. The bushing is provided with a recess 14, which forms a seat for the lug 17, which is secured to the rod 6, and by this means both the rod and the plate 5 are supported from the bushing and the bushing insulates the rod from the cover.

In order to allow of the bushing and rod to be readily disengaged from each other, I have formed in the bushing and opening into the aperture 10 a longitudinal groove 16, by means of which the lug 17 on the rod can be freed from the recess 14 by lifting the rod upwardly, and with it the bushing, until the boss 11 is freed from the recess 12, when the bushing can be turned so as to present the stud on the rod to the groove 16, when the bushing can be withdrawn from the rod and the parts disengaged.

Having described my invention, I claim—

1. The combination with the rod 6, of the apertured bushing 7, the rod being of less diameter than the aperture in the bushing, the recess 14 formed in the bushing and opening out of the top, said recess extending downwardly for a short distance and ending in a seat, a groove 16 formed in the interior of said bushing, and a stud extending outwardly and at right angles from the rod for coöperation with said recess and groove, both the recess 14 and groove 16 conforming in cross-section to the shape of the stud, as and for the purposes herein described.

2. The combination of the cell, the cover, the element depending from said cover, the plate surrounding said element, an upwardly-extending rod secured to said plate, an apertured insulating-bushing passing through said cover, a recess formed in said bushing opening into said aperture, a groove likewise formed in said bushing and passing entirely therethrough, a boss on the exterior of the bushing engaging a seated recess formed in the cover, and a stud extending from said rod for coöperation with either the recess or groove in the bushing, substantially as described.

3. The combination of the cell 1, cover 3 and bushing 7, the bushing having the head 8 and body 9, a boss 11 formed on the exterior of the body at the junction of the head and body, a hole 13 formed in said cover, and a seated recess 12 formed in the top of said cover at said hole for receiving the boss 11, substantially as and for the purposes herein set forth.

Signed at the city, county, and State of New York this 28th day of November, 1896.

WILLIAM MILLS.

Witnesses:
 B. S. WISE,
 WILLIAM JACOBSEN.